United States Patent
Toncelli

(10) Patent No.: US 12,454,483 B2
(45) Date of Patent: *Oct. 28, 2025

(54) METHOD FOR MANUFACTURING ARTICLES IN THE FORM OF A SLAB OR BLOCK WITH A HARDENING BINDER, AND ARTICLES THUS OBTAINED

(71) Applicant: Luca Toncelli, Bassano del Grappa (IT)

(72) Inventor: Luca Toncelli, Bassano del Grappa (IT)

( * ) Notice: Subject to any disclaimer, the term of this patent is extended or adjusted under 35 U.S.C. 154(b) by 1393 days.

This patent is subject to a terminal disclaimer.

(21) Appl. No.: 16/603,074

(22) PCT Filed: Apr. 10, 2018

(86) PCT No.: PCT/IB2018/052485
§ 371 (c)(1),
(2) Date: Oct. 4, 2019

(87) PCT Pub. No.: WO2018/189664
PCT Pub. Date: Oct. 18, 2018

(65) Prior Publication Data
US 2020/0377412 A1 Dec. 3, 2020

(30) Foreign Application Priority Data

Apr. 11, 2017 (IT) .................. 102017000040155

(51) Int. Cl.
| | |
|---|---|
| C04B 14/22 | (2006.01) |
| B28B 1/08 | (2006.01) |
| B28B 3/02 | (2006.01) |
| B29C 67/24 | (2006.01) |
| C03C 3/087 | (2006.01) |
| C03C 8/02 | (2006.01) |
| C04B 14/06 | (2006.01) |
| C04B 14/30 | (2006.01) |
| C04B 18/02 | (2006.01) |
| C04B 26/18 | (2006.01) |
| C04B 28/02 | (2006.01) |
| C04B 40/00 | (2006.01) |
| C04B 103/00 | (2006.01) |
| C04B 111/54 | (2006.01) |

(52) U.S. Cl.
CPC .............. *C04B 14/22* (2013.01); *B28B 1/082* (2013.01); *B28B 3/022* (2013.01); *B29C 67/243* (2013.01); *C03C 3/087* (2013.01); *C03C 8/02* (2013.01); *C04B 14/06* (2013.01); *C04B 14/30* (2013.01); *C04B 14/303* (2013.01); *C04B 14/304* (2013.01); *C04B 14/306* (2013.01); *C04B 18/02* (2013.01); *C04B 26/18* (2013.01); *C04B 28/02* (2013.01); *C04B 40/0067* (2013.01); *C04B 40/0089* (2013.01); *B29C 67/244* (2013.01); *C04B 2103/0043* (2013.01); *C04B 2103/0075* (2013.01); *C04B 2111/542* (2013.01); *Y02W 30/91* (2015.05)

(58) Field of Classification Search
CPC ..... C04B 14/22; C04B 26/18; C04B 40/0067; C04B 40/0089; C04B 2103/0043; C04B 2111/542; C04B 2103/0075; C04B 28/02; C04B 14/06; C04B 14/30; C04B 14/303; C04B 14/304; C04B 14/306; C04B 18/02; B28B 1/082; B28B 3/022; B29C 67/244; B29C 67/243; Y02W 30/91; C03C 3/087; C03C 8/02
See application file for complete search history.

(56) References Cited

U.S. PATENT DOCUMENTS

| | | | |
|---|---|---|---|
| 3,396,067 A * | 8/1968 | Schafer ................... | B44F 9/04 |
| | | | 523/521 |
| 5,164,425 A | 11/1992 | Uchida et al. | |
| 5,348,914 A * | 9/1994 | Thometzek .............. | C09D 7/67 |
| | | | 106/483 |
| 5,976,441 A | 11/1999 | Guyot et al. | |
| 6,517,915 B1 * | 2/2003 | Banus ...................... | B44F 1/14 |
| | | | 428/323 |
| 8,969,464 B2 | 3/2015 | Leblanc | |
| 9,199,415 B2 * | 12/2015 | Toncelli .................. | C04B 26/14 |
| 2004/0094863 A1 | 5/2004 | Brge et al. | |
| 2007/0210493 A1 | 9/2007 | Takahashi et al. | |
| 2008/0006956 A1 * | 1/2008 | Toncelli .................. | C04B 41/63 |
| | | | 264/71 |

(Continued)

FOREIGN PATENT DOCUMENTS

| | | |
|---|---|---|
| CA | 2060041 C | 4/1999 |
| CN | 101570331 A | 11/2009 |

(Continued)

OTHER PUBLICATIONS

Tulyaganov et al., Development of glass-ceramics by sintering and crystallization of fine powders of calcium-magnesium-aluminosilicate glass, Ceramics International, 28 (2002), pp. 515-520 (Year: 2002).*

(Continued)

*Primary Examiner* — Jeffrey M Wollschlager

(74) *Attorney, Agent, or Firm* — Fredrikson & Byron, P.A.

(57) ABSTRACT

In a method for manufacturing articles in the form of a slab or block, obtained by means of a procedure during which an initial mix including aggregates and a binder undergo vacuum vibro-compression followed by a step involving hardening of the binder, the aggregates include synthetic aggregates and fillers with a hardness greater than or equal to 5 Mohs, which contain silicon dioxide substantially only in amorphous form.

6 Claims, No Drawings

(56) References Cited

U.S. PATENT DOCUMENTS

| | | | | |
|---|---|---|---|---|
| 2011/0070444 | A1* | 3/2011 | Fujiwara | C09C 1/0021 501/67 |
| 2011/0151261 | A1* | 6/2011 | Fujiwara | A61K 8/26 428/402 |
| 2014/0057119 | A1* | 2/2014 | Nissila | C09D 167/06 428/480 |
| 2015/0042006 | A1 | 2/2015 | Kager | |
| 2016/0032108 | A1* | 2/2016 | Rusnak | C09D 5/00 427/427 |

FOREIGN PATENT DOCUMENTS

| | | |
|---|---|---|
| EP | 0493631 A1 | 7/1992 |
| EP | 1712583 B1 | 9/2020 |
| IT | 1056388 B | 1/1982 |
| IT | 1117346 B | 2/1985 |
| JP | H092858 A | 1/1997 |
| JP | H10507979 A | 8/1998 |
| KR | 20140095095 A | 7/2014 |
| WO | 0130719 A2 | 5/2001 |
| WO | 2006084827 A1 | 8/2006 |
| WO | 2006122892 A1 | 11/2006 |
| WO | 2011036623 A1 | 3/2011 |
| WO | 2017083671 A1 | 5/2017 |

OTHER PUBLICATIONS

Frits within a CaO—MgO—Al2O3—SiO2 System for Glass-Ceramic Glazes: a Comparison of Laboratory and Industrial Applications, Interceram, May 2012, pp. 283-285 (Year: 2012).*

Hutchinson Cuff, Y., "Ceramic Technology for Potters and Sculptors," 1996, pp. 122-123.

PCT International Search Report and Written Opinion dated Aug. 13, 2018 for International Application No. PCT.IB2018-052485, from which the instant application is based, 12 pgs.

Database WPI, Week 199711, Thomson Scientific, London, GB; AN 1997-115130, X002776444.

Posner, E., "Pneumoconiosis in makers of artificial grinding wheels, including a case of Caplan's Syndrom," Brit. J. Industr. Med., 1059, 17, pp. 109-113.

PCT Third Party Observation dated Jun. 19, 2019 for International Application No. PCT/IB2018/052485, 6 pgs.

Appendix D. [Retrieved from the web on Sep. 29, 2021 <URL: https://www.fhwa.dot.gov/publications/research/infrastructure/pavements/pccp/04150/appendd.cfm>] (Year: 2016).

Digital Fire Oxide Database (Year: 2005).

Ferro Frit Datasheet (Year: 2008).

The Editors of Encyclopaedia Britannica, Mohs hardness, Encyclopaedia Britannica, Oct. 5, 2016, 2 pages.

Laguna Clay Company, Ferro Corporation, 3134-2 Milled Glaze Frit 50 LB Bag Material Safety Data Sheet, Oct. 25, 2011, 5 pages.

Leadless and low alumina high calcia borosilicate frit, Ferro Frit 3134, Ceramic Materials, Digitalfire Reference Database, Aug. 10, 2016, 5 pages.

Ming-Yu Lee, etc., Artificial stone slab production using waste glass, stone fragments and vacuum vibratory compaction, Cement & Concrete Composites 30 (2008), 583-587, 1 page.

Wikipedia, Soda-lime glass,Apr. 16, 2017, 4 pages.

Encyclopaedia of Occupational Health and Safety, Fourth Edition, Glass, Glass, Ceramics and Related Materials, 1998, 3 pages.

Hanwha L&C/Surfaces and Hansstone Quartz, Understanding the art of Quartz, 62 pages.

Third Party Observation for Application No. EP20180721469. Took place on Feb. 9, 2022. 12 pages.

* cited by examiner

METHOD FOR MANUFACTURING ARTICLES IN THE FORM OF A SLAB OR BLOCK WITH A HARDENING BINDER, AND ARTICLES THUS OBTAINED

RELATED APPLICATIONS

This application is a 35 U.S.C. 371 national stage filing from International Application No. PCT/IB2018/052485, filed Apr. 10, 2018, which claims priority to Italian Application No. 102017000040155, filed Apr. 11, 2017, the teachings of which are incorporated herein by reference.

The present invention relates to a method for manufacturing articles in the form of a slab or block with a hardening binder, and to the articles thus obtained.

FIELD OF THE INVENTION

In particular, the present invention relates to a method for manufacturing articles in slab or block form in which the initial mix consists of granules of stone or stone-like material with a predetermined particle size and an organic and/or inorganic hardening binder.

It is known to manufacture this type of slab for example using the BRETONSTONE® system in which a mix consisting of stone material aggregates and a binder is poured into a temporary holder and subjected to vibration with simultaneous compression under a vacuum (vacuum vibro-compression).

BACKGROUND

An essential part of this process is vacuum vibro-compression which allows the possibility of using a minimum amount of binder and consequently the maximum amount of stone or stone-like aggregates, obtaining a slab with a very natural appearance.

With this process it is possible to obtain slabs having dimensions also as large as 2.1 m×3.6 m and a thickness which may be as much as 30 mm or more.

Considering the possible ingredients of the initial mix, these may comprise aggregates, fillers, binders, additives and colouring agents.

The aggregates normally consist of natural minerals which may be of a siliceous nature, such as quartz, granites, porphyry, basalt, quartzite, silica sands, or of a calcareous nature, such as marbles, dolomite, coloured stones, etc.

These materials may be used in the form of sands or granulates of varying dimensions, depending on the aesthetic and physical/mechanical characteristics which are to be obtained in the end products.

Sometimes, for aesthetic reasons, the formulations may also include coloured-glass granules, even though they are not very scratch-resistant having a Mohs hardness normally of not more than 4, or other decorative elements such as crushed shells. Sometimes glass granulates are also used in high percentages in order to obtain special aesthetic effects, even though articles which have a poor scratch or abrasion resistance are obtained.

Mineral fillers are materials which are used together with the binder to form the so-called binding paste. Fillers normally consist of stone materials of a varying kind which are finely ground, such as aerated silica or aerated feldspar for agglomerates formed with siliceous aggregates, and calcium carbonate or aluminium hydroxide for agglomerates formed with calcareous aggregates.

Articles made using as aggregate and filler quartz ground respectively into a sand or fine powder have become commercially widespread. Owing to the transparency of quartz it is possible to produce, with the suitable addition of coloured pigments, articles with a high-quality appearance which are very resistant to scratching/abrasion and chemical agents such as commonly used acids (citric acid contained in lemon juice, acetic acid, which is a component of vinegar, etc.).

The binder of an organic nature which is commonly used is a resin, for example a non-saturated polyester resin, or an acrylic or acrylic/urethane resin or also resins of vegetable origin such as seed oils epoxidized with anhydrides.

Alternatively it is possible to use a binder of a cementitious nature.

As well-known to the person skilled in the art, in the case of a resin, hardening is preferably performed by applying heat inside an oven, while in the case of a cementitious binder it is required to perform curing of the slab.

The additives are components which are added in small quantities to the mixes in order to obtain given results, such as catalysts and accelerators for hardening the resin or the coloured pigments.

Methods of this type are described in Italian patents Nos. 1117346 and 1056388.

The prior art, although widely used and appreciated, is not without drawbacks.

One particularly troublesome drawback arises from the use, as aggregates and fillers, of materials such as quartz or quartzite or silica sands or more generally the use of materials which during machining of the end product, such as cutting of the slab, give rise to the formation of silicon dioxide ($SiO_2$) dust in the crystalline state.

This dust, when dispersed into the atmosphere, may be very harmful for human health if inhaled, causing a pulmonary disease called silicosis.

This problem is well-known to the person skilled in the art and normally the person performing machining should wear personal protection devices designed to prevent inhalation of the dust.

The problem, however, does not arise if, during machining, for example cutting or shaping, water is conveyed into the zone of contact between tool and material since this prevents the propagation into the air of the harmful substances in the form of dust.

However, these two precautionary conditions (use of personal protection devices and/or spraying of the machining zone with water) are not always respected and therefore there exists the need to produce upstream an end product which has the desired mechanical and/or chromatic properties, but which completely avoids the generation of substances which are harmful for the operators and thereby the consequences of incorrect behaviour which could result in serious damage to their health.

BRIEF SUMMARIES OF OBJECTS OF THE INVENTION

The object of the present invention is to solve at least partially the drawbacks of the prior art, in connection with the widespread industrial use of quartz as an aggregate and filler.

A first task of the present invention is therefore to provide a method for manufacturing articles which are made without using quartz, but which have characteristics in terms of appearance and performance similar to those of products which contain quartz and which do not give rise to crystalline silicon dioxide dust during machining operations.

A second task of the present invention is to provide an article made without using quartz, but which has characteristics in terms of appearance and performance similar to those of products which contain quartz and which does not give rise to crystalline silicon dioxide dust during machining operations.

The object and tasks are achieved with a method and with an article, each according to the claims herein.

DETAILED DESCRIPTION OF EMBODIMENTS OF THE INVENTION

The advantages and characteristic features of the present invention will emerge more clearly from the detailed description below of a number of examples of embodiment provided by way of a non-limiting example.

In particular, the idea which has occurred is to use synthetic aggregates and fillers which are very hard and semi-transparent or whitish, with an appearance similar to quartz, but which contain silicon dioxide substantially only in amorphous form in a method for manufacturing articles in slab or block form, instead of aggregates and/or fillers which are obtained from the grinding of quartz and which, during machining operations such as cutting, could cause the aforementioned problems.

Essentially, the idea which has occurred is to use synthetic aggregates and fillers which are very hard and semi-transparent or whitish, with an appearance similar to quartz, but comprising silicon dioxide substantially only in amorphous form instead of quartz which during the (slab or block) machining process would produce crystalline silicon dioxide dust. The synthetic aggregate and filler containing silicon dioxide substantially only in amorphous form may be a special amorphous glass, called "frit" in technical jargon, which is very hard and semi-transparent or whitish, with an appearance similar to quartz; traces of silicon dioxide in crystalline form could be present, but in any case in amounts less than 1% by weight.

A frit with these characteristics may be obtained by melting at about 1550° C. a mixture of selected natural mineral powders. The molten material output from the melting furnace is struck directly by a water jet for quick cooling, then dried, ground and separated into the desired granulometric fractions.

The thinner granulometric fractions are used as fillers.

In accordance with a possible embodiment of the present invention, the synthetic aggregate and filler with hardness ≥5 Mohs containing silicon dioxide substantially only in amorphous form may form at least 70% by weight of the aggregates and filler of the initial mix.

Advantageously, the synthetic aggregate and filler with hardness ≥5 Mohs containing silicon dioxide substantially only in amorphous form may form between 70% and 100% by weight of the aggregates and filler of the initial mix.

Advantageously, the glass frit with hardness ≥5 Mohs used may have the following chemical composition:

$48\% < SiO_2 < 73\%$, $12\% < CaO < 30\%$, $1.5 < MgO < 11\%$, $1.0\% < Al_2O_3 < 19\%$, and $0\% < ZrO_2 < 20\%$.

Or the glass frit with hardness ≥5 Mohs used may have the following chemical composition:

$43\% < SiO_2 < 80\%$, $5\% < CaO < 30\%$, $0\% < MgO < 12\%$, $0\% < Al_2O_3 < 25\%$, and $0\% < ZrO_2 < 20\%$, $0\% < Na_2O < 12\%$, $0\% < K_2O < 10\%$.

Optionally the frit may also contain the following further components:

$0\% < B_2O_3 < 10\%$ $0\% < ZnO < 10\%$ $0\% < BaO < 10\%$ $0\% < Li_2O < 5\%$ $0\% < P_2O_5 < 5\%$

Advantageously the frit with hardness ≥5 Mohs may have a colour which has a high degree of whiteness (with L>95) or is translucent. These colours are similar to those of quartz which is used in the initial mixes of the known type.

For this purpose the quantities of cromophores must be particularly low so that the aforementioned chemical composition may further comprise:

$Fe_2O_3 < 0.1\%$; and $TiO_2 < 0.1\%$.

The hardness of the frit granules may be preferably greater than 5 Mohs and even more preferably greater than 6 Mohs.

The frit used is moreover resistant to acids (except for hydrofluoric acid) and has a good resistance to strong bases. Moreover, it is characterized by a total chemical inertia and by complete water insolubility, even in hot conditions, without the need for further heat treatment. Advantageously there is no release of any metals which may be present.

Moreover, the frit used has a good yield during grinding with a limited tendency to produce dust or flakes when ground.

The other steps of the method for producing the slab remain substantially the same as in the prior art.

After the initial mix has been prepared it is deposited inside a temporary holder, which may be a so-called tray mould (in the case of a slab) or a formwork (in the case of a block).

Then the surface of the mix may be covered with a sheet of material which is similar to that forming the tray mould, or a lid in the case of a formwork for the production of blocks.

The holder containing the mix is then inserted inside a bell inside which the vacuum is created and the mix is subjected via a press ram to vacuum vibro-compression.

Advantageously the vacuum created may have a residual pressure of between 10 and 25 mbar.

Advantageously the vacuum vibro-compression may last between 30 and 70 seconds.

Once the vibro-compression operation has been completed, the atmospheric pressure is restored and the bell is opened.

The slab is then transferred into a catalysis oven, in the case where resin is used as a binder, or is left to cure in the case where a cementitious binder is used.

Once the article has hardened, it is extracted from the holder and is conveyed away for the finishing operations.

The advantages which may be obtained compared to the conventional methods for manufacturing articles in the form of slabs or blocks according to the prior art are therefore evident.

Firstly, it is possible to produce articles with a high-quality appearance and resistance to scratching and chemical agents which, during machining operations, such as cutting, do not result in the formation of silicon dioxide dust in crystalline form.

Secondly, by preventing the formation of this component, it is possible to avoid beforehand the consequences of any incorrect behaviour of operators during the machining operations.

Moreover, it is possible to obtain a slab with aesthetic, mechanical and performance characteristics very similar to those achieved with quartz, which at present are very widespread and popular on the market.

The person skilled in the art, in order to satisfy specific needs, may make modifications to the embodiments described above and/or replace the elements described with equivalent elements, without thereby departing from the scope of the attached claims.

The invention claimed is:

1. A method for manufacturing articles in form of a slab or block, said articles being obtained by means of a method during which an initial mix comprising aggregates and a binder undergoes vacuum vibro-compression followed by a step involving hardening of the binder, characterized in that the aggregates comprise synthetic aggregates and fillers with a hardness greater than or equal to 5 Mohs, wherein the synthetic aggregates and fillers have the following chemical composition by weight:

$48\% < SiO_2 < 73\%$, $12\% < CaO < 30\%$, $1.5 < MgO < 11\%$, $1.0\% < Al_2O_3 < 19\%$, and $0\% < ZrO_2 < 20\%$;

the $SiO_2$ present being substantially only in amorphous form and in any case with a possible content of $SiO_2$ in crystalline form less than 1% by weight;
wherein the binder used is of an organic nature and is an unsaturated polyester resin; and
wherein the chemical composition of the synthetic aggregates and fillers also comprises the following further components by weight:

$0\% < B_2O_3 < 10\%$, $0\% < ZnO < 10\%$, $0\% < BaO < 10\%$, $0\% < Li_2O < 5\%$, and $0\% < P_2O_5 < 5\%$.

2. The method according to claim 1, characterized in that at least 70% by weight of the synthetic aggregates and fillers consists of a hardness greater than or equal to 5 Mohs, which contain silicon dioxide substantially only in amorphous form with a possible content of $SiO_2$ in crystalline form less than 1% by weight.

3. The method according to claim 2, characterized in that the chemical composition also comprises $Fe_2O_3 < 0.1\%$ and $TiO_2 < 0.1\%$ by weight.

4. An article obtained with an initial mix comprising aggregates and a binder having undergone vacuum vibro-compression and hardening of the binder, the aggregates comprising synthetic aggregates and fillers having a hardness greater than or equal to 5 Mohs, wherein the synthetic aggregates and fillers have the following chemical composition by weight:

$48\% < SiO_2 < 73\%$, $12\% < CaO < 30\%$, $1.5 < MgO < 11\%$, $1.0\% < Al_2O_3 < 19\%$, and $0\% < ZrO_2 < 20\%$;

the silicon dioxide present being substantially only in amorphous form and in any case with a possible content of $SiO_2$ in crystalline form less than 1% by weight;
wherein the binder used is of an organic nature and is an unsaturated polyester resin; and
wherein the chemical composition of the synthetic aggregates and fillers also comprises the following further components by weight:

$0\% < B_2O_3 < 10\%$, $0\% < ZnO < 10\%$, $0\% < BaO < 10\%$, $0\% < Li_2O < 5\%$, and $0\% < P_2O_5 < 5\%$.

5. The article according to claim 4, characterized in that at least 70% of the initial mix is formed of the synthetic aggregates and fillers with a hardness greater than or equal to 5 Mohs, which contain silicon dioxide substantially only in amorphous form.

6. The article according to claim 4, characterized in that the chemical composition also comprises $Fe_2O_3 < 0.1\%$ and $TiO_2 < 0.1\%$ by weight.

* * * * *